United States Patent [19]
Bartlett

[11] Patent Number: 5,871,335
[45] Date of Patent: *Feb. 16, 1999

[54] TWIST-LOCK ATTACHMENT SYSTEM FOR A COOLING FAN AND MOTOR

[75] Inventor: Eric Raymond Bartlett, St. Thomas, Canada

[73] Assignee: Siemens Electric Limited, London, Canada

[*] Notice: This patent issued on a continued prosecution application filed under 37 CFR 1.53(d), and is subject to the twenty year patent term provisions of 35 U.S.C. 154(a)(2).

[21] Appl. No.: 690,191

[22] Filed: Jul. 26, 1996

Related U.S. Application Data

[63] Continuation of Ser. No. 551,191, Oct. 31, 1995, abandoned.

[51] Int. Cl.⁶ .................................................. F04D 29/20
[52] U.S. Cl. ................................ 416/244 R; 416/169 A; 403/349
[58] Field of Search ........................... 416/169 A, 244 R, 416/244 B, 134 R, 204 R; 403/348, 349

[56] References Cited

U.S. PATENT DOCUMENTS

| | | |
|---|---|---|
| 3,387,768 | 6/1968 | Zoehfeld .............................. 416/134 R |
| 4,102,601 | 7/1978 | Bischoff . |
| 4,245,957 | 1/1981 | Savage et al. . |
| 4,391,548 | 7/1983 | Malish ................................... 403/348 |
| 4,532,672 | 8/1985 | Anderson ............................... 403/349 |
| 4,923,365 | 5/1990 | Rollwage . |
| 4,941,805 | 7/1990 | Matthews ............................ 416/204 R |
| 5,193,981 | 3/1993 | Scheidel et al. .................... 416/169 A |
| 5,326,225 | 7/1994 | Gallivan et al. . |
| 5,342,126 | 8/1994 | Heston et al. .......................... 403/349 |
| 5,423,660 | 6/1995 | Sortor . |
| 5,478,206 | 12/1995 | Prahst . |

FOREIGN PATENT DOCUMENTS

| | | |
|---|---|---|
| 30 39 035 | 4/1982 | Germany . |
| 92 05 097 | 9/1993 | Germany . |

*Primary Examiner*—Christopher Verdier

[57] ABSTRACT

A cooling fan assembly (13) is attached to a motor (11) by a mating, "twist-lock" adaptor plate (30) having radial lugs (33), which engage a shouldered recess (23) in a corresponding hub (22A).

16 Claims, 7 Drawing Sheets

FIG. 3
FIG. 4
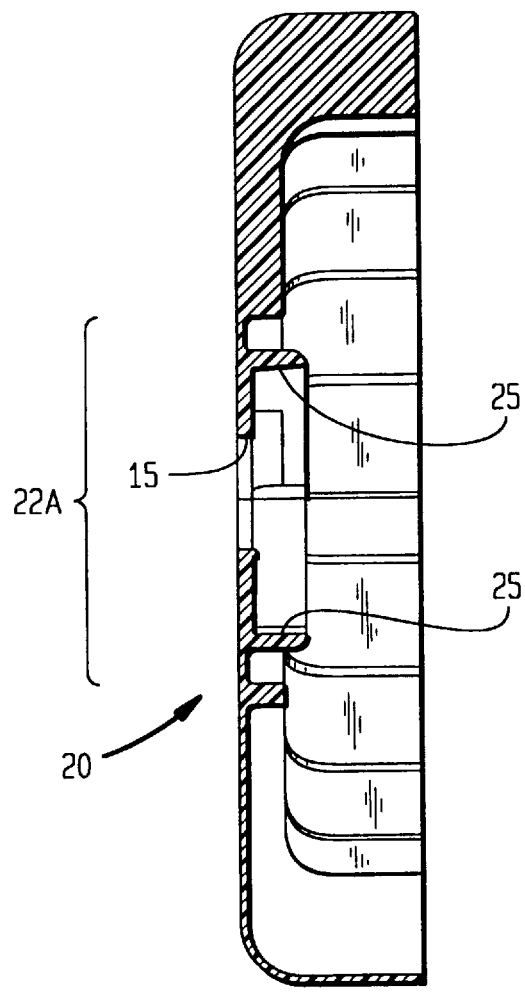
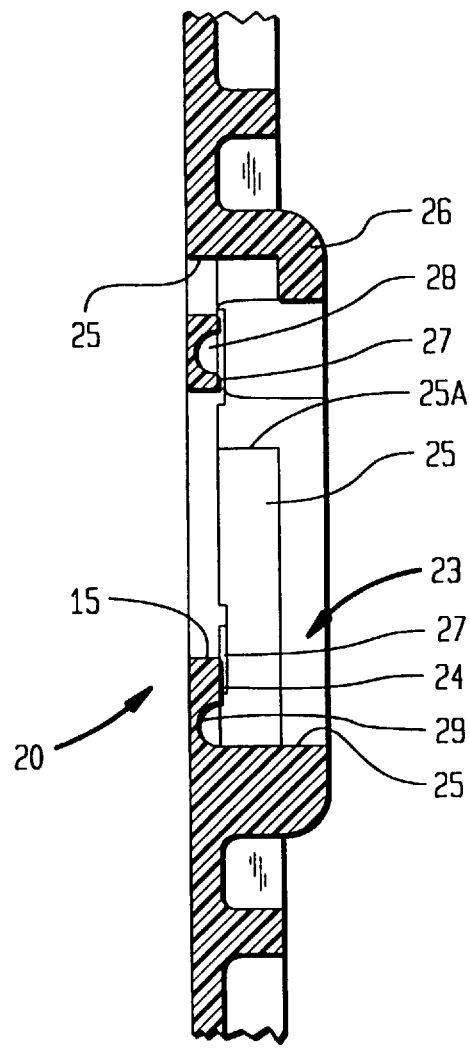

TWIST-LOCK ATTACHMENT SYSTEM FOR A COOLING FAN AND MOTOR

CROSS-REFERENCE TO RELATED APPLICATION

This is a continuation of Ser. No. 08/551,191 filed Oct. 31, 1995 now abandoned.

BACKGROUND OF THE INVENTION

The present invention is directed to attachment systems for mounting cooling fans on motors, and particularly, automotive cooling system fans which are driven by electric motors.

Automotive cooling systems often employ cooling fans which are driven by electric motors. The fan must be physically attached to the motor in some manner. The cooling fan and motor system must be relatively compact, and ideally the axial length of the fan and motor assembly should be minimized, in order to be accommodated in the ever-decreasing design allocation space afforded under the hood of a modern automobile. Another imperative in the automotive industry is to reduce manufacturing costs through simplification of parts fabrication and assembly. In an effort to maximize fuel economy, it is also desirable to reduce weight of the fan and motor assembly wherever feasible.

There is also a need for high reliability in the cooling system and motor assembly, which is often exposed to rain and water splashing; sometimes in corrosive environments such as near sea shores. Consumer demand for vehicles which run quietly with minimal vibration requires that the combined fan and motor assembly operate with minimal noise and vibration; hence fan and motor dynamic running imbalance during operation and the life cycle of the components must be minimized.

As one skilled in the art can appreciate, minimization of size, weight, noise and vibration during the life cycle of the unit as well as manufacturing cost, with maximization of reliability often present conflicting design parameters, and ultimately design choices.

Previously known motor fan and cooling assemblies have attached the fan to the motor shaft by radial spring clips, similar to belleville washers, which provided axial tension to secure the fan to the shaft. The spring clip engaged the shaft in a groove formed in the shaft. Over the life cycle of the fan and motor, the spring clip could have fatigued and thereafter broken, which caused separation of the fan from the motor shaft. Addition of a spring clip securing attachment system to a fan and motor assembly inherently increased the axial length of the assembled structure. It is also noted that the spring clip did not readily inhibit a rocking of the fan relative to the motor shaft for two reasons: (a) the spring clip flexed in response to rocking loads on the fan, and (b) the relatively small diameter of the spring clip did not leave a very large bearing surface to counteract rocking loads on the fan.

Other known mounting attachment systems for cooling fans and motor shafts involved molding a metal hub within the fan. The metal hub was attached to the motor shaft via a pin, such as a roll pin. The molded-in-place hub and pin mounting system increased manufacturing complexity in a number of ways. First, the motor shaft was drilled to receive the pin. Second, plastic fans which included molded-in-place metal hubs were inherently more expensive to manufacture than fans which were only constructed of plastic. Third, the fan and motor assemblies which required insertion of pins added additional manufacturing assembly steps.

There has been a long-felt need in the automotive industry for a motor and cooling fan attachment system which reduced axial length of the assembly, reduced weight and manufacturing costs, increased reliability during the life cycle of the product and maintained good dynamic balance (hence lower vibration and noise) over the life cycle of the product, yet was relatively inexpensive to manufacture and assemble.

SUMMARY OF THE INVENTION

The present invention solves these long-felt needs in the automotive industry for a cooling fan and motor attachment system which minimizes axial length of the assembled unit, reduces weight, increases reliability and maintains dynamic balance through the life cycle of the unit, while reducing manufacture and assembly costs. The cooling fan and motor attachment assembly of the present invention also allows easy disassembly and reassembly of the motor and fan without adversely impacting dynamic balance of the reassembled unit. The cooling fan and motor fan of the present invention features a "twist-lock" engagement of an adaptor plate with radial lugs that is attached to one of the motor and fan, into a shouldered recess of a corresponding hub that is attached to the other of the motor and fan.

The present invention features a cooling fan and motor attachment system comprising an adaptor plate, for attachment to one of a motor and a cooling fan, having at least one radially outwardly projecting lug. The system also has a hub, for attachment to the other of the motor and cooling fan, having a recess defined therein for axially-oriented insertion of the adaptor plate therein, and a shoulder for capture of the lug upon relative locking rotation of the adaptor plate and hub.

The present invention also features a cooling fan and motor attachment system comprising an adaptor plate, for attachment to one of a motor shaft and a cooling fan, having a plurality of radially outwardly projecting lugs. The system also has a hub for attachment to the other of the motor shaft and cooling fan, having a recess defined by a front face, and a generally radially-oriented sidewall, for axially-oriented insertion of the adaptor plate therein. The hub recess is further defined by a plurality of shoulders, corresponding to each respective lug, axially spaced apart from the front face, for capture of respective lugs upon relative locking rotation of the adaptor plate and the hub.

The present invention also features a cooling fan and motor system comprising a motor having a motor shaft and a cooling fan. An adaptor plate is attached to one of the motor shaft and cooling fan, having a plurality of radially symmetrically-oriented, outwardly projecting lugs. A hub is attached to the other of the motor shaft and cooling fan, having a recess defined by a front face, a generally radially-oriented sidewall, and a plurality of shoulders, corresponding to each respective lug, axially spaced in opposed fashion relative to the front face, for axially-oriented insertion of the adaptor plate into the recess between the shoulders and for capture of respective lugs upon relative locking rotation of the adaptor plate and hub. Projecting detents are disposed on one of the adaptor plate and hub and corresponding recesses on the other of the adaptor plate and hub, which engage relative to each other upon relative locking rotation of the hub and adaptor plate.

DESCRIPTION OF THE DRAWINGS

FIG. 3 is a sector-shaped, cross-sectional elevational view taken along 3—3 of FIG. 2.

FIG. 4 is a fragmented, elevation cross-sectional view of the hub portion of the fan taken along 4—4 of FIG. 2, with the remaining portions of the fan broken away.

DETAILED DESCRIPTION OF THE PREFERRED EMBODIMENT

Figure 1:
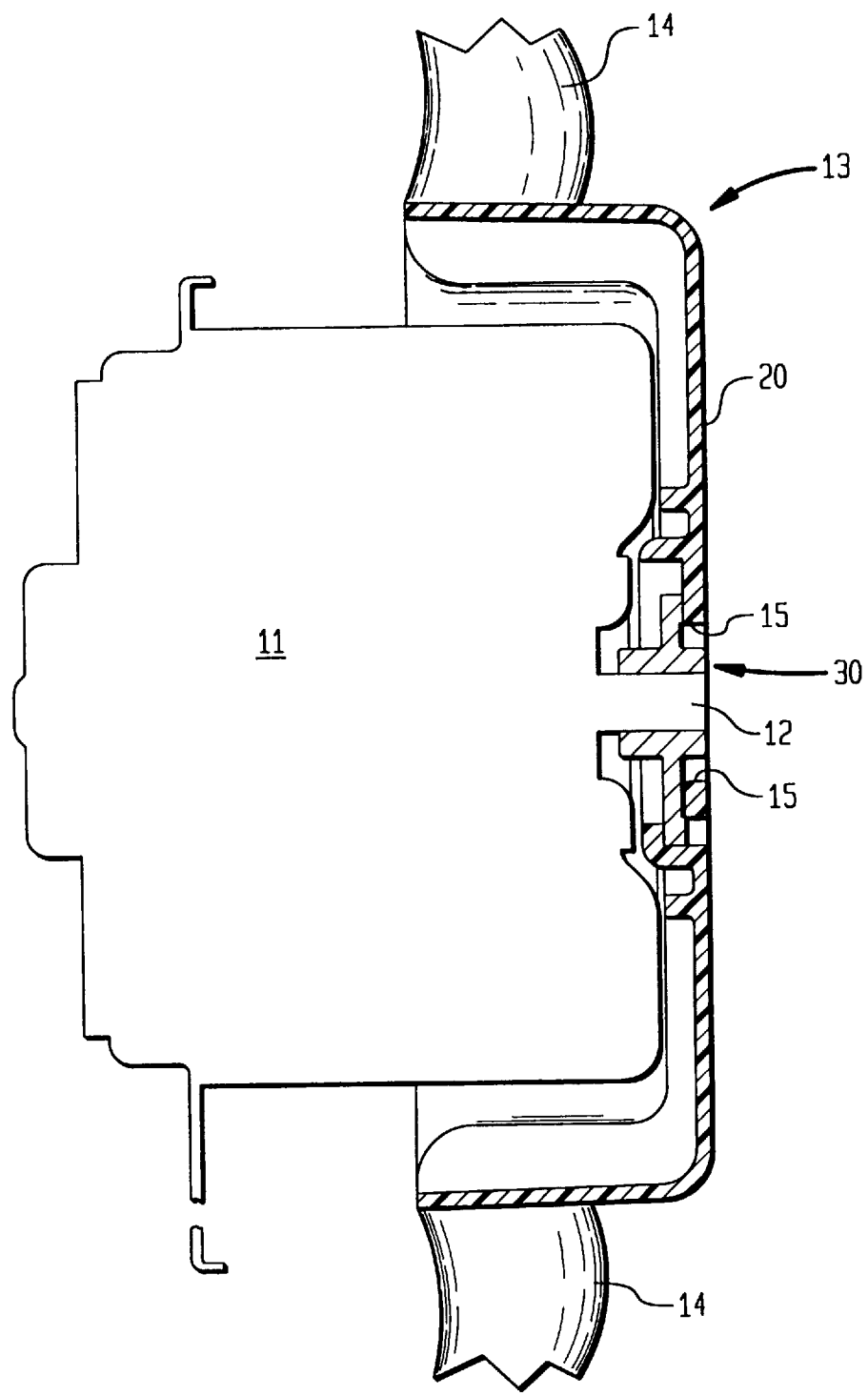
FIG. 1 is a partial axial cross-sectional view of the motor and cooling fan attachment system of the present invention, with the motor and broken-away fan blades shown schematically for simplification of the figure.
Figure 2:
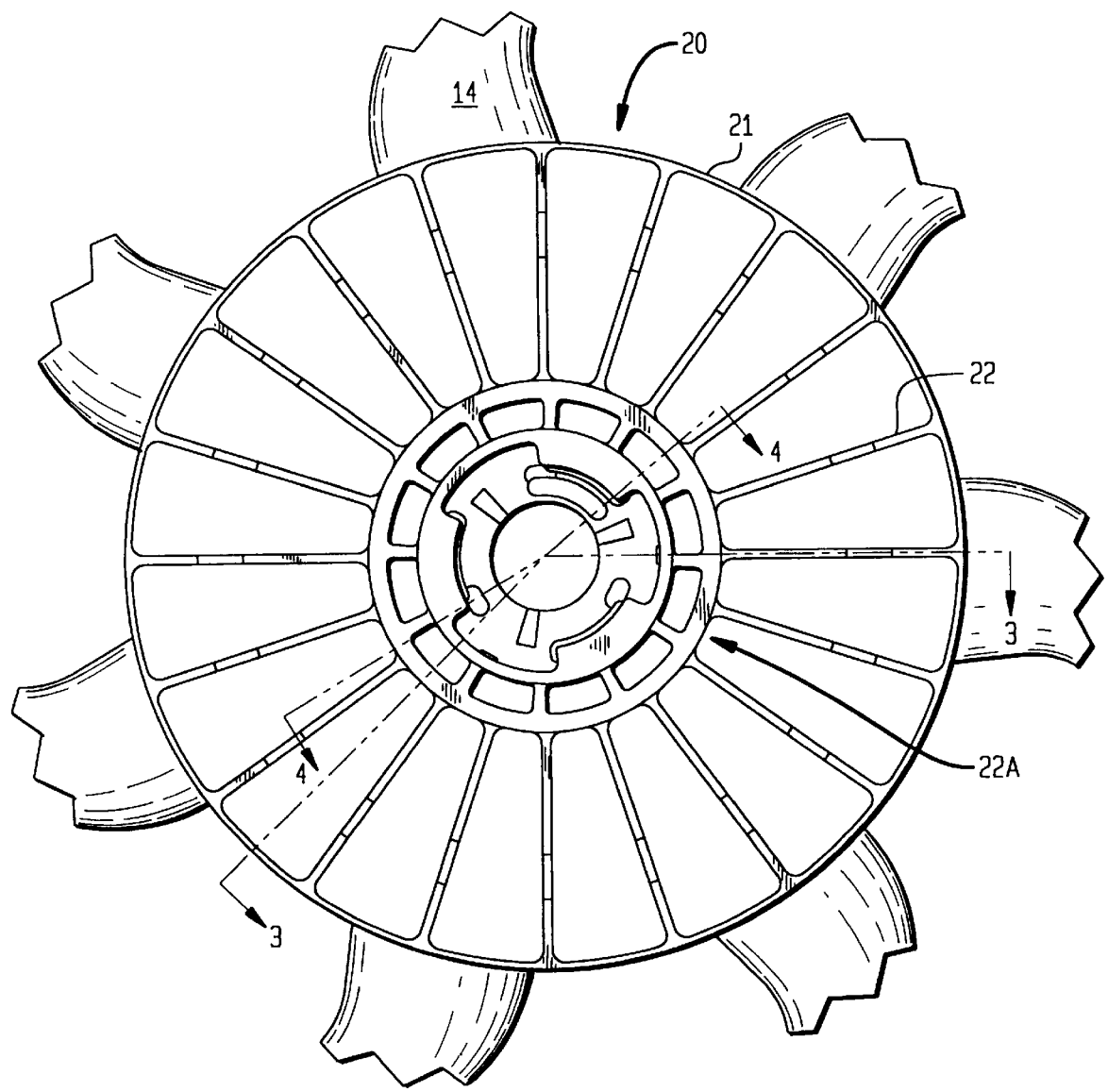
FIG. 2 is a rear elevational view of the cooling fan of FIG. 1, with the broken-away fan blades shown schematically.
Figure 2A:
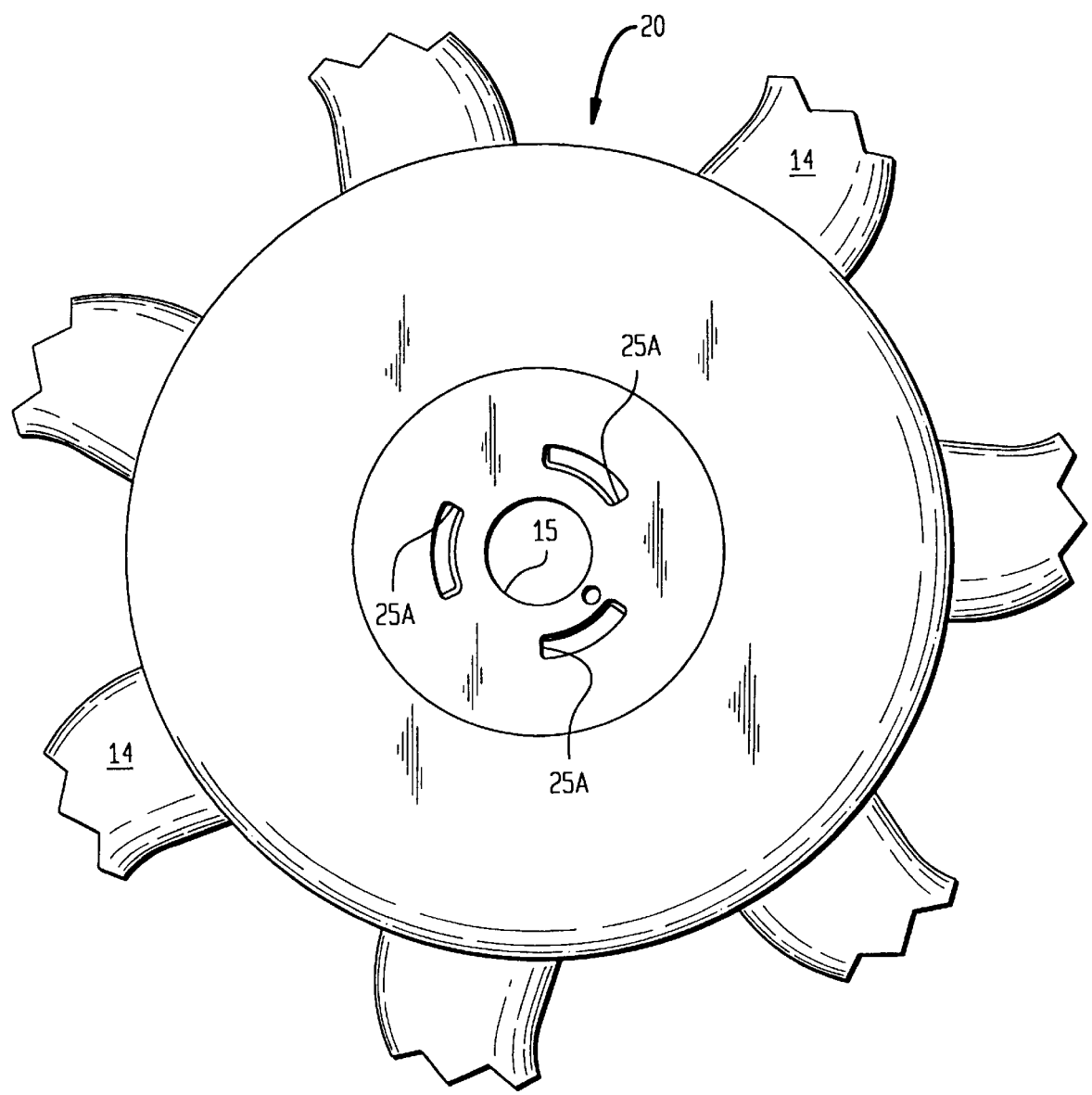
FIG. 2A is a front elevational view of the cooling fan of FIG. 2.

FIG. 1 shows a partial cross-sectional, elevational view of an assembled cooling fan drive motor 11, having a shaft 12 and a cooling fan 13, that includes a plurality of fan blades 14, which can be constructed in any way known in the art. An example of such a fan blade construction is shown in U.S. Pat. No. 5,326,225, the entire contents of which is hereby incorporated by references as if fully set forth herein. The fan assembly 13 also defines a central hole 15 within the rotor 20 thereof, to which the roots of the fan blades 14 are attached. Adaptor plate 30 connects the rotor 20 to the motor shaft 12 in a manner which is described below.

Referring now generally to FIGS. 2–6, the fan 13 rear and front elevational views are shown, with particular details of the drawings directed to the rotor 20, including the rotor skirt 21 to which is attached the roots of the fan blades 14, the rotor reinforcing ribs 22 and the hub 22A. Hub 22A has formed therein a hub recess 23 which includes a generally flat front face 24, a radially-oriented sidewall 25, and a hub driven edge 25A.

The hub 22A also defines shoulders 26 which are axially spaced apart from the front face 24 and which project radially inwardly from the sidewall 25. The rotor shoulders 26 are advantageously symmetrically-spaced around the periphery of the rotor hub 22A for dynamic balance of the fan assembly 13. While three shoulders 26, each spaced at 120 degrees relative to each other, are shown in the figures, it should be understood that any other number of shoulders can be selected for application in connection with this invention. It is even possible that a single shoulder could be utilized, but a preferable minimum would be at least two symmetrically-spaced shoulders. Alternatively, the shoulders 26 may be asymmetrically shaped and/or spaced, but it is advisable to achieve dynamic balance of the system.

Figure 5:
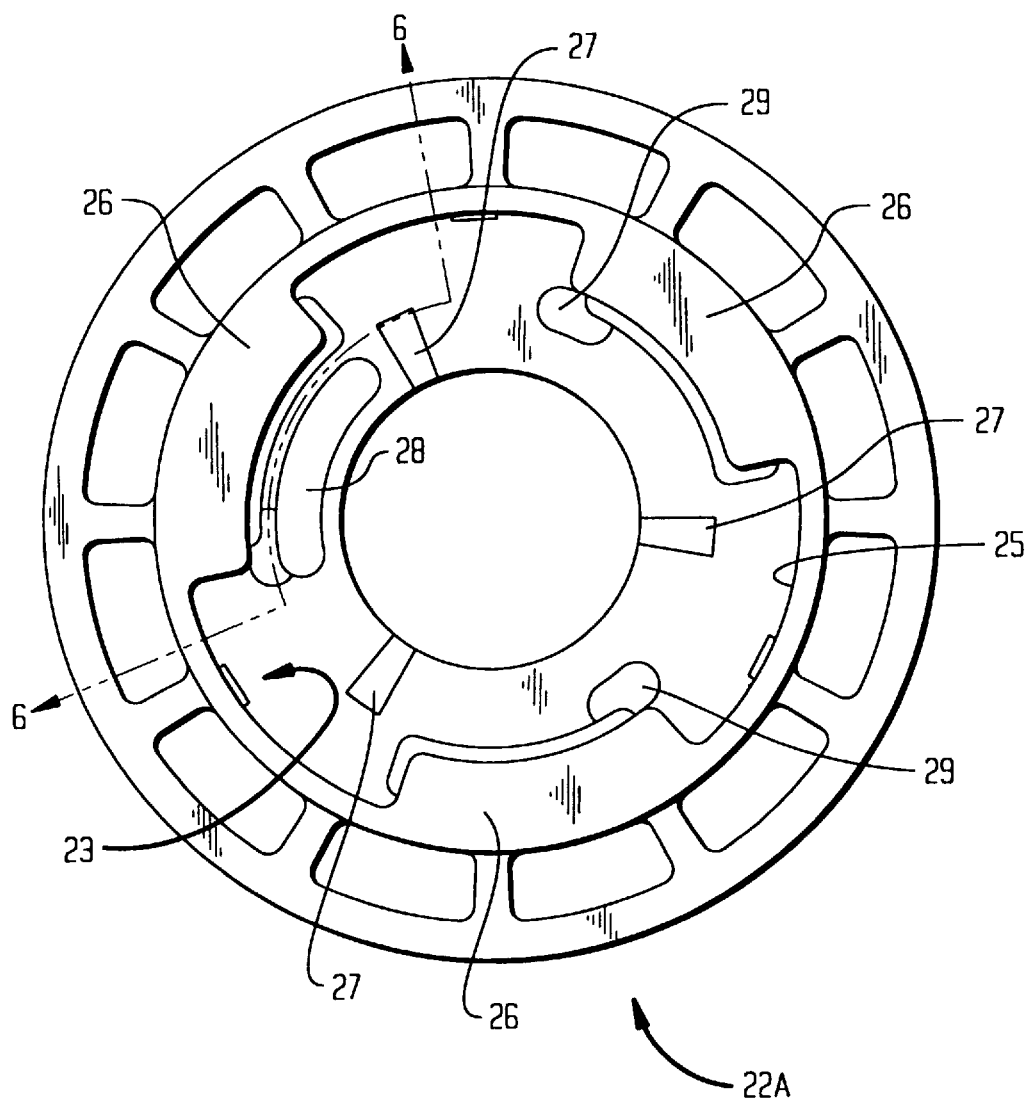
FIG. 5 is a detailed rear elevational view of the hub portion of the fan of FIG. 2.
Figure 6:
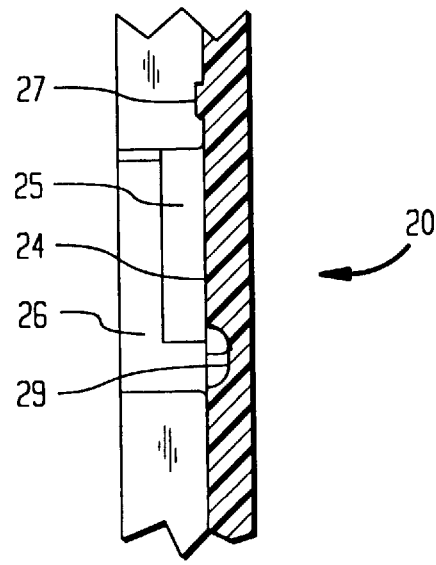
FIG. 6 is a sector-shaped fragmented cross-sectional view of the hub portion taken along 6—6 of FIG. 5.
Figure 7:
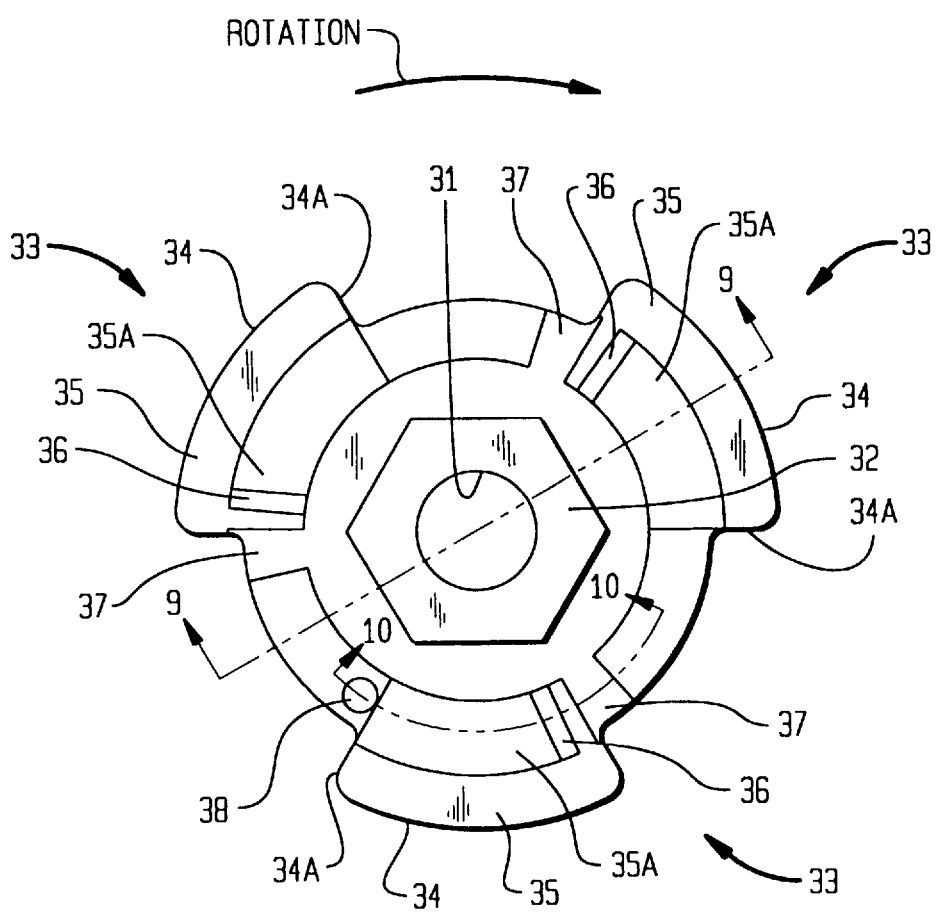
FIG. 7 is a front elevational view of the adaptor plate portion of the assembly of FIG. 1.
Figure 8:
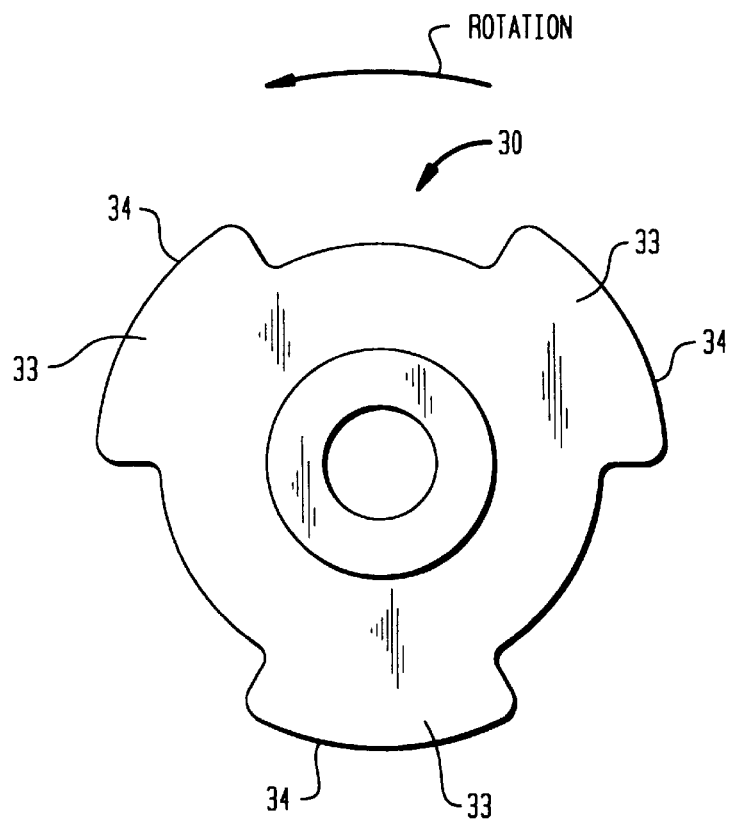
FIG. 8 is a rear elevational view of the adaptor plate of FIG. 7.
Figure 9:
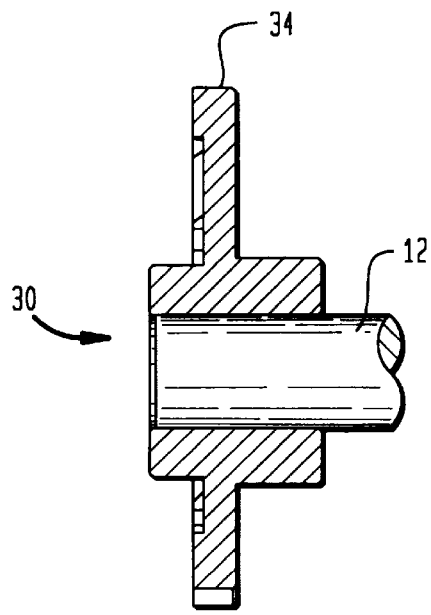
FIG. 9 is a radial cross-sectional view of the adaptor plate taken along 9—9 of FIG. 7.
Figure 10:
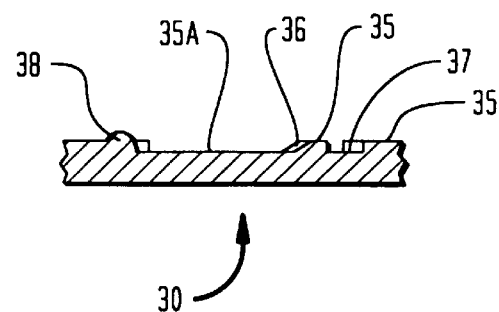
FIG. 10 is a sector-shaped cross-sectional view of the adaptor plate taken along 10—10 of FIG. 7.

As shown especially in FIGS. 5 and 6, the hub 22A also has a plurality (in this case 3 are shown) of detents 27 which project axially from the hub front face 24. The hub 22A front face 24 also has a groove 28, and desirably stress relief undercuts 29. The specific function of the detents 27, groove 28 and stress relief undercuts 29 will be explained in greater detail below with respect to assembly of the finished product.

The structure of the adaptor plate 30 will now be described with reference to FIGS. 7–10. The adaptor plate has a bore 31, for attachment of the motor shaft 12 thereto, preferably by shrink fitting there between. However, it should be understood that other attachment structure may also be utilized; for example, bonding, brazing, welding or use of a pin. It has been found that shrink fitting provides sufficient torsional shearing resistance to loads imposed by the fan 13. The adaptor plate 30 has a hex formation 32 which may be formed therein, and use of which will be described in greater detail below with respect to assembly of the finished product.

Adaptor plate lugs 33 project radially from the adaptor plate 30. Each of the adaptor plate lugs 33 defines a radially outer edge 34, and a lug drive edge 34A. The adaptor plate 30 also has an engagement face 35, which has a ramped portion 36 that declines from the surface of the engagement face 35 to a clearance cut 35A. Adaptor plate 30 also has detent recesses 37, that correspond to each respective hub detent 27. A key 38 which may advantageously be formed in a partially spherical outer profile, is provided on the engagement face 35. The function of the detent recesses 37 and the key 38 will be described below with respect to assembly of the finished product.

The fan assembly 13 is preferably constructed from an integral, one-piece molding. A suitable molding material for the fan assembly 13 is thermal plastic having a 12 percent fiberglass content and a 28 percent mineral content, such as "NYLON 66" sold by E. I. DuPont de Nemours of Delaware, USA, though it is contemplated that any other plastic suitable for manufacture of automotive cooling fans may be substituted therefor.

The adaptor plate 30 may be advantageously constructed in a single unitary powdered metal sintering process. Any suitable sintered metal may be utilized, but 50,000 PSI (345 MPa) tensile strength powdered metal is suitable for this application. The motor shaft 12 may be constructed of mild steel, which is common in the fractional-horsepower motor industry.

The complete motor 11 and cooling fan 13 system is easily assembled. The adaptor plate 30 is attached to the motor shaft 12, such as by shrink fit as previously described, either before, during or after complete motor fabrication. The adaptor plate 30 is inserted into the fan assembly 13, such as shown in FIG. 1. Upon insertion of the adaptor plate 30 into the hub recess 23, the hub 22A and adaptor plate 30 are rotated relative to each other. Thereupon, the adaptor plate 30 radial lugs 33 are captured within the hub recess 23 by the hub front face 24, the radial sidewall 25, the hub driven edge 25A, the shoulders 26, and the hub detent 27, which accomplishes "twist-lock" capture, as will be described in greater detail as follows.

The "twist-lock" assembly of the adaptor plate 30 and fan hub 22A can be accomplished by insertion of a socket or other type wrench through hole 15 formed in the fan assembly 13 and engagement with the hex formation 32 formed within the adaptor plate 30. The wrench may then be used to effectuate the required twisting force necessary to cause relative rotation of the adaptor lugs 33 and the fan hub 22A.

Figure 11:
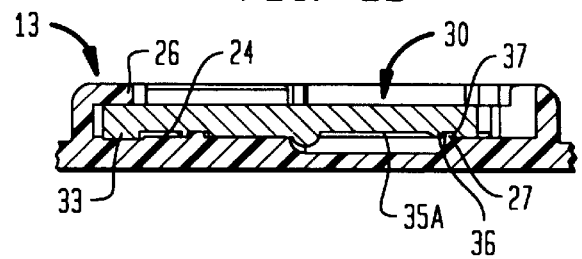
FIG. 11 is a sector-shaped cross-section of the assembled hub portion of the fan and the adaptor plate, taken along 11—11 of FIGS. 2 and 7, respectively.

Upon assembly of the fan 13 to the adaptor plate 30, by insertion of the plate into the hub 22A and relative rotation there between, the hub detent 27 rides in adapter clearance cut 35A, as the lugs 33 engage with the hub shoulders 26. Thereafter upon continued rotation, axially-directed contact between the hub detent 27 and the ramp portion 36 of adaptor plate 30 spreads the hub 22A shoulder portion 26 axially outwardly and away from the hub front face 24. Further "twist-lock" rotation of the adaptor plate 30 relative to hub 22A, urges the detents 27 of the fan assembly 13 to engage and lock within the recesses 37 of the adaptor plate 30, as shown in FIG. 11. "Twist-lock" rotation is completed upon engagement of the lug drive edge 34A with the hub driven edge 25A.

Stress relief undercuts 29 formed in the fan hub 22A front face 24 help resist potential cracking of the fan hub 22A during the insertion of the adaptor plate 30 insertion and twisting of the rotor plate 30, which might otherwise occur due to flexure of the hub shoulders 26. The stress relief undercuts 29 also advantageously help resist cracking of the fan assembly 13 if one or more of the fan blades are impacted or otherwise rapidly shock-loaded during operation of the fan, such as for example, if a large stream of water or solid debris should inadvertently be sucked into the rotating fan structure.

Key 38 formed in the adaptor plate 30 and its corresponding mating groove 28 formed in the hub 22A front face 24, provide for a single assembly orientation of the components for ease of dynamic balancing during manufacture of the entire cooling system assembly as shown in FIG. 11. The key 38 and corresponding groove 28 also assure proper balanced component orientation during reassembly of the components, if they are ever disassembled for service. Alternatively, the shoulders 26 and legs 33 may be asymmetrically spaced or profiled, to provide for a single assembly orientation of the components. Of course, if asymmetrical orientation or profiling of shoulders 26 and lugs 33 is chosen as part of a design, it is preferable that the assembled structure be dynamically balanced by any technique known in the art.

Through selection of molding tolerances of the hub portion 22A of fan assembly 13 and the adaptor plate 30, a tight radial and axial fit of the adaptor plate 30 and hub 22A can be accomplished, to ensure rotational stability during assembly and throughout the life cycle of the fan and motor assembly. By dimensioning the inner radial dimension of the hub 22A sidewall 25 smaller than the radial dimension of the adaptor plate lug radial outer edge 34, a biased interference fit can be accomplished. Similarly, by dimensioning the actual spacing between the hub 22A front face 24 and the shoulders 26 smaller than that of the axial width of the adaptor plate 30, a biased interference fit can be accomplished in the axial dimension.

Biased, interference fit of the resilient plastic hub 22A against the rigid adaptor plate 30 provides sufficient dimensional bias to compensate for differences in coefficients of thermal expansion of the metal hub 30 and the plastic fan assembly 13, as well as compensation for deformation or creep caused by aging of the plastic fan structure 13 during its life cycle.

Lastly, the biased, interference fit between the hub 22A and the adaptor plate 30 occurs at a relatively long radial distance from the centerline of the motor shaft 12. This radial spacing provides a widely spaced and large planar surface area of abutting engagement between the adaptor plate 30 and the hub 22A for resistance of rocking or oscillating loads on the fan assembly 13 relative to the motor shaft 12, which in turn enhances dynamic rigidity and consequent reduction in vibration.

While the preferred embodiment of the present invention has been shown and described herein, it should be understood that variations of the preferred embodiment may be made by those skilled in the art which nonetheless fall within the scope of the claims as appended hereto. It is possible to modify of the component structure of the fan assembly 13 and the adaptor plate 30. For example, the key 38 could be formed in the fan hub 22A and the corresponding groove 28 could be molded into the adaptor plate 30. Similarly, the hub recess 23, along with its front face 24, radial sidewall 25, shoulders 26 and detent 27 (or any sub-combination thereof) could be formed in the adaptor plate and the corresponding lugs 33, engagement face 35, ramp portion 36, detent recess 37 and key 38 could be correspondingly formed in the fan structure 13. It is possible that any sub-structure component shown respectively on fan 13 and adaptor plate 30 of the FIGS. 1–10 of this disclosure can be selectively reversed at the discretion of one skilled in the art. Also, the lugs and shouldered hub could interlock axially rather than radially; and the detents and corresponding detent recesses could be oriented radially, rather than axially.

What is claimed is:

1. A cooling fan and motor attachment system comprising:

a cooling fan;

a motor constructed and arranged to be coupled to said cooling fan;

an adapter plate coupled to one of said motor and said cooling fan, said adapter plate having a plurality of circumferentially spaced, radially outwardly projecting lugs, a hub coupled to the other of said motor and said cooling fan, said hub having a front face, a generally radially-oriented sidewall, and a plurality of circumferentially spaced shoulders corresponding to each respective lug, said front face and said sidewall defining bounds of a recess in said hub, each of said shoulders being axially spaced from said front face and extending within said recess, each of said shoulders having a capturing surface generally opposing said front face, said capturing surfaces of said shoulders and said front face being constructed and arranged to capture said lugs therebetween upon generally axially-oriented insertion of said adapter plate into said recess and relative locking rotation of said adapter plate with respect to said hub to lock said cooling fan to said motor.

2. The system of claim 1, wherein respective lugs and shoulders are radially symmetrically oriented.

3. The system of claim 1, wherein said respective lugs and shoulders are symmetrically oriented.

4. The system of claim 1, further comprising at least one detent disposed on and projecting from one of said adapter plate and hub and at least one corresponding recess on the other of said adapter plate and hub, which engage relative to each other.

5. The system of claim 1, wherein said adapter plate has three lugs and said hub has three shoulders.

6. The system of claim 1, wherein one of said hub and adapter plate has a key projecting therefrom and the other of said hub and adapter plate has a corresponding groove for receipt of said key.

7. The system of claim 1, wherein said adapter plate has a bore for attachment to a shaft of said motor.

8. The system of claim 1, wherein:

said hub is formed of resilient material; and said recess is defined by a generally radially oriented side wall, portions thereof being symmetrically oriented and in radially-biased engagement with radial outer edges of the adapter plate, and said shoulders are symmetrically oriented and in axially-biased engagement with said adapter plate.

9. A cooling fan and motor system comprising:

a motor;

a cooling fan;

an adapter plate, attached to one of the motor and cooling fan, having a plurality of radially symmetrically-oriented, outwardly projecting lugs;

a hub, attached to the other of the motor and cooling fan, said hub having a front face, a generally radially-oriented sidewall, and a plurality of shoulders corresponding to each respective lug, said front face and said sidewall defining bounds of a recess in said hub, each of said shoulders being axially spaced from the front face and extending within said recess, each of said shoulders having a capturing surface directly opposing said front face, said capturing surfaces of said shoulders and said front face capturing said lugs therebetween upon generally axially-oriented insertion of the adapter plate into said recess and relative locking rotation of said adapter plate with respect to said hub to lock said cooling fan to said motor; and projecting detents disposed on and projecting from one of the adapter plate and hub and corresponding recesses on the other of the adapter plate and hub, which engage relative to each other upon relative locking rotation of the hub and adapter plate.

10. The system of claim 9, wherein:

(a) the hub is formed of resilient material;

(b) the generally radially-oriented sidewall defines portions thereof which are symmetrically oriented and in radially-biased engagement with radial outer edges of the adaptor plate, and the shoulder is symmetrically oriented and in axially-biased engagement with the adaptor plate upon said relative locking rotation of the adaptor plate and hub.

11. The system of claim 10, wherein the adaptor plate further comprises an engagement face, for abutment against the hub shoulder, having a ramped portion oriented axially relative to the hub.

12. The system of claim 9, wherein at least one lug has a drive edge which engages a hub driven edge.

13. The system of claim 9, wherein the adaptor plate has three lugs and the hub has three shoulders.

14. The system of claim 9, wherein one of the hub and adaptor plate has a key projecting therefrom and the other of the hub and adaptor plate has a corresponding groove for receipt of the key.

15. The system of claim 9, wherein the adaptor plate has a bore for attachment to the motor shaft and the hub is attached to the other cooling fan.

16. The system of claim 9, wherein the hub defines undercuts on a surface defining the recess.

* * * * *